(12) United States Patent
von Harras et al.

(10) Patent No.: US 10,582,719 B2
(45) Date of Patent: Mar. 10, 2020

(54) DAIRY CREAM ALTERNATIVE

(71) Applicant: Upfield US Inc., Englewood Cliffs, NJ (US)

(72) Inventors: Jaimy Chantal von Harras, Hellevoetsluis (NL); Eckhard Flöter, Kleinmachnow (DE)

(73) Assignee: UPFIELD US INC., Englewood Cliffs, NJ (US)

( * ) Notice: Subject to any disclaimer, the term of this patent is extended or adjusted under 35 U.S.C. 154(b) by 20 days.

(21) Appl. No.: 14/386,276

(22) PCT Filed: Mar. 8, 2013

(86) PCT No.: PCT/EP2013/054683
§ 371 (c)(1),
(2) Date: Sep. 18, 2014

(87) PCT Pub. No.: WO2013/139614
PCT Pub. Date: Sep. 26, 2013

(65) Prior Publication Data
US 2015/0044329 A1  Feb. 12, 2015

(30) Foreign Application Priority Data
Mar. 23, 2012 (EP) .................................. 12160924

(51) Int. Cl.
*A23L 9/00* (2016.01)
*A23L 9/20* (2016.01)

(52) U.S. Cl.
CPC ............ *A23L 9/22* (2016.08); *A23V 2002/00* (2013.01)

(58) Field of Classification Search
CPC . A23L 1/193; A23L 9/22; A23C 23/12; A23C 13/16; A23C 13/12; A23C 12/16
USPC ......................................................... 426/33
See application file for complete search history.

(56) References Cited

U.S. PATENT DOCUMENTS

| 5,518,752 | A  | 5/1996 | Ito et al. |
| 8,124,158 | B2 | 2/2012 | Oonishi et al. |
| 8,809,388 | B2 | 8/2014 | Perlman et al. |

| 2005/0069619 | A1* | 3/2005 | Bot ...................... A23D 7/0053 426/601 |
| 2007/0071873 | A1  | 3/2007 | Ichiyama et al. |
| 2011/0262599 | A1* | 10/2011 | Dilley ................... A23D 9/007 426/101 |

FOREIGN PATENT DOCUMENTS

| EP | 0540085 | 5/1993 |
| EP | 0540087 | 5/1993 |
| EP | 0667104 | 8/1995 |
| EP | 2641476 | 8/2014 |
| JP | 2008263790 | 11/2008 |
| JP | 2010075071 | 4/2010 |
| WO | WO2005041676 | 5/2005 |
| WO | WO2007096243 | 8/2007 |

OTHER PUBLICATIONS

Occurrence and characterisation of oils and fats, -, -, 49-53.
Frederick et al, Factors govering partial coalescence in oil-in-water emulsions, Advances in colloid and interface science 2010, 30-42, 153.
Gunstone et al, -, The Lipid Handbook, -, 52 and 63, 3rd edition.
IPRP2 in PCTEP2013054683, dated Sep. 24, 2013.
Search Report in EP12160924, dated Sep. 11, 2012.
Search Report in PCTEP2013054683, dated Apr. 4, 2013.
Wan Rosani AWG ISA et at, Palm-based Trans-free whipped topping as an alternative to dairy cream, Palm Oil Dev, -, 13, 20-25, 48.
Written Opinion in EP12160924, dated Sep. 11, 2012.
Written Opinion1 in PCTEP2013054683, dated Apr. 4, 2013.
Written Opinion2 in PCTEP2013054683, dated Jun. 27, 2013.
Written Opinion in EP13708781, dated Jul. 16, 2015.
Gunstone et al., Major oils from plant sources, The Lipid Handbook, 2007, PP51, 54, 67, 3rd Edition.
Search Report in EP12160170, dated Sep. 11, 2012.
Written Opinion in EP12160170, dated Sep. 11, 2012.

* cited by examiner

*Primary Examiner* — Jeffrey P Mornhinweg
(74) *Attorney, Agent, or Firm* — Arent Fox LLP

(57) ABSTRACT

The invention relates to a fermented food product being a water-continuous emulsion and being spoonable and non-liquid at a temperature of 5 degrees Celcius. The food product has a pH-value between 3.5 and 5.8, comprises at least 60 wt % water and further comprises from 10 to 25 wt % fat and from 0.05 to 15 wt % protein. The invention further relates to a process for the preparation of such food products comprising the use of a palm based fat comprising at least 30 wt % of P2U triglycerides.

18 Claims, No Drawings

DAIRY CREAM ALTERNATIVE

FIELD OF THE INVENTION

The present invention relates to spoonable non-liquid water-continuous acidified food products and a process for the preparation thereof.

BACKGROUND OF THE INVENTION

Non-dairy products, like liquid whipping creams, spreads and products with a spoonable non-liquid consistency are products wherein at least part of the dairy fat is replaced by vegetable fat. Such products are generally known as dairy cream alternatives. In general, vegetable fats are regarded as being healthier than dairy fat like milk fat and butter fat as the unsaturated fatty acid content in vegetable fats are higher than in dairy fat. Furthermore, especially natural vegetable fats that have not undergone hydrogenation have a lower trans unsaturated fatty acid content than dairy fats.

Crème fraiche is a well known dairy product that is obtained by fermenting a regular cream by certain kinds of lactic acid bacteria. The bacterial culture, which is introduced either deliberately or naturally, sours and thickens the cream.

Traditional crème fraiche contains about 28 weight percent (wt %) of butter fat (based on total product) with a pH of about 4.5. Compared with traditional sour cream containing about 18 to 20 wt % butter fat, crème fraiche has a different viscosity and a higher fat content. To address health concerns, light or reduced-fat crème fraiche have been developed that contain about 40% less butter fat than regular crème fraiche. Although such products contain less fat, the saturated fatty acid (SAFA) content of the used fat is still that of dairy fat.

Dairy cream alternatives have been developed as an alternative for crème fraiche based on dairy cream. For example, soured spoonable cream alternatives are described in EP 540085 and EP540087 based on fat mixtures of liquid oil and hardened lauric fats.

Consumers nowadays prefer lower fat products, like for example 25 wt % or less. Such products, including dairy cream alternatives, are not always easy to make as the lower overall fat content may detrimentally affect product properties, like for example firmness and organoleptic properties.

In addition, there is a drive to not only lower the total amount of fat, but also the SAFA level of the fat itself as excessive consumption of SAFA has been associated with cardiovascular diseases.

The drive for lower fat and lower SAFA level of the fat itself is challenging as this may affect for example the organoleptic properties of products like crème fraiche and non-dairy cream alternatives thereof. Notably it affects the Indulgency characteristics' like for example the rich mouthfeel, for which these products are known and appreciated.

It is an object of the present invention to provide lower fat dairy cream alternatives of crème fraiche like products. It is another object of the present invention to provide lower fat dairy cream alternatives of crème fraiche like products that are low in SAFA. A further object of the present invention is to provide lower fat dairy cream alternatives of crème fraiche like products that provide good organoleptic properties and/or have good product firmness.

SUMMARY OF THE INVENTION

It was found that spoonable non-liquid water-continuous acidified food products with at least 30 wt % of P2U triglycerides based on total amount of fat and wherein P is palmitic acid and U is unsaturated fatty acid provide good low fat dairy cream alternatives of crème fraiche like products.

Accordingly the invention relates to a fermented food product being a water-continuous emulsion, being spoonable and non-liquid at a temperature of 5 degrees Celsius, having a pH-value between 3.5 and 5.8, the food product comprising at least 60 wt % water and further comprising from 10 to 25 wt % fat and from 0.05 to 15 wt % protein, wherein the fat comprises at least a vegetable fat and wherein the fat comprises from 0 to up to 60 wt % of saturated fatty acids (SAFA), at least 30 wt % P2U triglycerides and from 0 to up to 7 wt % P3 triglycerides, wherein the ratio of SAFA:P2U is up to 1.7, and wherein P is palmitic acid and U is unsaturated fatty acid.

The invention further relates to process for the preparation of such a food product comprising the use of a palm based fat comprising at least 30 wt % of P2U triglycerides.

DETAILED DESCRIPTION OF THE INVENTION

Weight percentage (wt %) is based on the total weight of the composition unless otherwise stated. The terms 'fat' and 'oil' are used interchangeably. Where applicable the prefix 'liquid' or 'solid' is added to indicate if the fat or oil is liquid or solid at ambient temperature as understood by the person skilled in the art. The term 'structuring fat' refers to a fat that is solid at ambient temperature. Ambient temperature is a temperature of about 20 degrees Celsius.

Spoonable Non-Liquid Water-Continuous Acidified Food Product

The food product of the invention is a water-continuous emulsion comprising at least 60 wt % of water and further comprising a dispersed fat phase. Preferably the food product comprises at least 70 wt % and more preferably at least 80 wt % of water.

The product is spoonable and non-liquid at a temperature of 5 degrees Celsius. As such, it is similar to the structure of a traditional crème fraiche. For the avoidance of doubt, this excludes for example whipping cream as this may be conceived to be spoonable but is liquid at 5 degrees Celsius.

The food product of the invention may contain some air, or may even be slightly whipped to impart specific organoleptic properties like in a whipped butter like product. Preferably the food product of the invention has an overrun of less than 100%, more preferable less than 50%, even more preferably less than 20% and still more preferably less than 10%.

Fat

The food product comprises from 10 to 25 wt % of fat based on total amount of product. Preferably the amount of fat is from 10 to 20 wt % and more preferably from 12 to 18 wt %.

The fat comprises at least 30 wt % of P2U triglycerides based on total amount of fat. It was found that this provides for good product structure and organoleptic properties even when the amount of SAFA is 60 wt % or lower (based on total amount of fat). P is palmitic acid and U is unsaturated fatty acid. The amount of SAFA and P2U should be such that the ratio of SAFA:P2U is not more than 1.7, that is, it should be 1.7 or below. For example, a fat with 60 wt % of SAFA and 35 wt % of P2U gives a ratio of 1.7.

Preferably the amount of P2U in the fat is at least 35 wt %, preferably at least 40 wt % and more preferably at least 45 wt %, as it was found that a higher amount of P2U provides for a better structure and organoleptic properties without the need for high amounts of SAFA.

Preferably the ratio of SAFA:P2U is up to 1.6, more preferably up to 1.5, even more preferably up to 1.4 and still even more preferably up to 1.3 as this allows for a healthier product while maintaining the desired product properties. The ratio of SAFA:P2U is at least 1.

The food products of the invention have excellent firmness, expressed as Stevens value, over the amount of SAFA.

The fat comprises at least a vegetable fat and may comprise dairy fat. However, preferably the fat is essentially free of dairy fat which implies that the level of dairy fat on total fat is preferably below 10 wt %, more preferred below 5 wt % and even more preferred below 1 wt %. This regards added dairy fat and does not include dairy fat derived from the other ingredients such as dairy fat included in milk powders.

The fat may be a single fat or a blend of different fats. The vegetable fat may be selected from any edible source but it is preferred that the fat is chosen from coconut oil, palm kernel oil, palm oil, soybean oil, rapeseed oil, sunflower oil, safflower oil and blends thereof. Preferably the fat comprises at least a palm based vegetable fat, like for example a palm oil mid fraction. Even more preferably the fat comprises a palm based fat and liquid vegetable oil and is free of dairy fat. Preferably the fat consists of a palm based fat, like for example a palm oil mid fraction.

Preferably the unsaturated fatty acid is oleic acid (C18:1), that is the P2U is P2O, wherein O is oleic acid.

Preferably the fat comprises up to 6 wt % P3 triglycerides, more preferably up to 5 wt %, even more preferably up to 4 wt % and sill even more preferably up to 3 wt %.

Natural Fats

Triglycerides (i.e. triacylglycerols (TAG)) are the major constituents of natural fats and oils and are esters of glycerol and fatty acids. The chemical structure of the fatty acid and the distribution of the fatty acids over the glycerol backbone determine (at least partly) the physical properties of a fat. The physical properties of fats, like for example the solid fat content (SFC) expressed as N-value, can be modified by altering the chemical structure of the fat. Well known techniques that are widely used include hydrogenation and interesterification.

Hydrogenation alters the degree of unsaturation of the fatty acids and as such alters the fatty acid composition. This allows e.g. plastic fats to be made from liquid oils. A draw back of hydrogenation, especially of partial hydrogenation, is the formation of by products like e.g. trans fatty acids. Furthermore additional process steps are required and some consumers perceive a chemical process such as hydrogenation as undesirable.

Interesterification retains the fatty acid composition but alters the distribution of the fatty acids over the glycerol backbones. Interesterification can be done chemically or with the aid of enzymes. Usually a mixture of two different fats, that by themselves are not or less suitable as a structuring fat, is subjected to interesterification. The resulting interesterified fat will have improved structuring properties compared to the starting materials. A draw back of interesterification may be the formation of by products like e.g. free fatty acids and diglycerides. Also enzymatic interesterification introduces additional process steps which may be complicated and introduce additional costs. Furthermore some consumers perceive chemically modified fats as unnatural and therefore undesirable.

Therefore, food products according to the invention preferably are free of hydrogenated fats and more preferably are free of chemically modified fat.

Protein

The food product comprises from 0.05 to 15 wt % of protein based on total amount of product. The protein, in combination with the low pH, provides at least part of the structure and taste of the product.

Preferably the amount of protein is from 1 to 10 wt %, preferably 2 to 8 wt %, more preferably from 2 to 6 wt % and still more preferably from 2.5 to 4 wt %.

The protein is preferably selected from milk protein, soy protein, pea protein and combinations thereof. The use of milk protein as at least part of the protein is highly preferred because of the positive effect of milk protein on the taste and flavor of the final product.

Preferably at least 50 wt % of the protein is milk protein, more preferably at least 70 wt %, even more preferably at least 80 wt %, still even more preferably at least 90 wt % and even still more preferably at least 95 wt %.

Suitable sources of milk protein are for example milk, skimmed milk or skim milk powder, butter milk or butter milk powder, butter serum powder, whey or whey powder, whey protein concentrate, whey protein isolate, caseinate or a combination thereof. The most preferred protein is protein originating from buttermilk because of its superb taste and flavor contribution. The most preferred proteins are whey, whey protein isolate or whey protein concentrates.

Acidification

The food products of the invention have a pH of about 3.5 to 5.8, preferably between 4.2 and 5.2 and most preferred between 4.3 and 4.7

Acidification is obtained by microbial acidification (i.e. fermentation). Acidification may take place by microbiological acidification alone or in combination with chemical acidification. Suitable chemical acidification may be achieved by for example using lactic acid, glucono delta-lactone or another acidifying agent. The pH can be further adjusted by the use of a base such as sodium hydroxide It is preferred that the cultures used for the fermentation are made inactive after the acidification.

The pH of the food product is a pH below the pH of gelling of the protein. When more than one protein is used, the acidification is done at a pH below the pH of the protein having the highest pH of gelling.

When a protein like whey protein is used, the pH of gelling is about 5.8 and so in this case, the preferred pH over which the emulsion is acidified is about 5.8 to 3.5. The acidification may be carried out using acidifying bacteria alone, or in combination with a chemical acidifying agent. The emulsion is cooled to the culturing temperature. When the desired pH is achieved, the emulsion may be heated to a high temperature preferably above 60 degrees Celsius to inactivate the culturing bacteria.

Preferably the food product is a fermented food product obtained with only microbiological acidification and without the use of additional chemical acidification; as such a method of acidification may provide a better taste profile. In addition we have found that fermentation works best with the fat, SAFA and P2U content of the food products of the invention.

Further Ingredients

Food products of the invention may comprise other ingredients like thickeners and gelling agents.

The concentration of thickeners and gelling agents preferably is from 0.01 to 3 wt %. It will be appreciated that each individual thickener and gelling agent will have its own optimal concentration, which may depend on other characteristics of the food product such as the protein source, pH and salt content.

The invention also concerns a process for the preparation of the food product of the invention comprising the use of a palm based fat comprising at least 30 wt % of P2U triglycerides.

Preferably the food product is acidified using only fermentation.

The invention is now illustrated by the following non-limiting examples.

EXAMPLES

Stevens Value

Stevens values give an indication about the hardness (also called firmness) of a product at a given temperature. Firmness is the maximum force, expressed in grams, to penetrate a product over a given distance at a fixed speed with a specific probe. The Stevens value at a given temperature is determined according to the following protocol.

Products are stored at 5 degrees Celsius for at least 24 hours before being measured. The hardness of the product is then measured with a TA.XT.plus Texture Analyser (ex. Stable Micro Systems Ltd.) equipped with a cylindrical probe with a diameter of 12.7 mm (0.5 inch) and operated in "normal" mode. The probe is pushed into the product at a speed of 2 mm/s, a trigger force of 5 gram over a distance of 10 mm. The maximum force required is read from the digital display and is expressed in grams.

Preparation

Food products according to the invention (examples 1 to 4) and not according to the invention (comparative examples A to D) were prepared using the general composition as in Table 1, using the fat blends as in Table 2 according to the following method.

The water (room temperature) was put in a non-heated jacketed premix vessel. About half the amount of water was combined with the sweet butter milk powder, skimmed milk powder and starch in a separate vessel. After mixing with a Silverson high speed mixer, the mixture was put back into the premix vessel. The content of the premix vessel was stirred and heated to about 50 degrees Celsius. At about 50 degrees Celsius the molten fat blend was added. The combined mixture was heated up to about 75 degrees Celsius and pumped at a flow rate of approximately 120 kg/hr through an in-line Silverson mixer running at 6000 rpm, a tubular heat exchanger for pasteurization at 83 degrees Celsius and a single stage homogenizer at 150 bar After homogenization the mixture was collected in a second vessel and cooled to about 25 degrees Celsius.

Subsequently the lactic acid culture was added, stirred for about 5 minutes and left to ferment. When the mixture reached a pH of between 4.3 and 4.7 the mixture was stirred to break-up the curd. About a quarter of this fermented mixture was mixed with the guar gum and pectin with a Silverson high speed mixer and subsequently mixed with the remainder of the product.

The combined mixture was heated to about 75 degrees Celsius and subsequently pumped at a flow rate of approximately 80 kg/hr through a tubular heat exchanger for pasteurization at 83 degrees Celsius and a single stage homogenizer at 50 bars.

The product was hot filled in sealed tubs and stored at 5 degrees Celsius. The firmness (Stevens value) was measured after 7 to 16 days using the protocol described above.

TABLE 1

Composition of the food product

| Ingredient | wt % on total product |
| --- | --- |
| Fat blend - see Table 2 | 14.8 |
| Sweet buttermilk powder | 6.5 |
| Skimmed milk powder | 2.0 |
| Lactic acid culture (Probat M7, ex. Danisco) | 0.03 |
| Tapioca starch | 1.5 |
| Pectin | 0.1 |
| Guar gum | 0.12 |
| De-mineralized water | Balance to 100 wt % |

TABLE 2

Fat blends

| Fat blend | Composition |
| --- | --- |
| 1 | 100 wt % palm oil midfraction (ex. Loders) |
| 2 | 90 wt % palm oil midfraction (ex. Loders)/10 wt % of an interesterified mixture of (86% palm oil/8 palm kernel oil/6% palm oil stearin) |
| 3 | 80 wt % palm oil midfraction (ex. Loders)/20 wt % of an interesterified mixture of (86% palm oil/8 palm kernel oil/6% palm oil stearin) |
| 4 | 70 wt % palm oil midfraction (ex. Loders)/30 wt % of an interesterified mixture of (86% palm oil/8 palm kernel oil/6% palm oil stearin) |
| 5 | 75 wt % palm oil midfraction (ex. Loders)/25 wt % rapeseed oil |
| 6 | 50 wt % palm oil midfraction (ex. Loders)/50 wt % of an interesterified mixture of (86% palm oil/8 palm kernel oil/6% palm oil stearin) |
| 7 | 70 wt % palm oil midfraction (ex. Unimils)/30 wt % of an interesterified mixture of (86% palm oil/8 palm kernel oil/6% palm oil stearin) |
| A | 100 wt % of an interesterified mixture of (86% palm oil/8 palm kernel oil/6% palm oil stearin) |

TABLE 3

Fat blend parameters and product performance

| Fat blend | SAFA # (wt %) | P2U # (wt %) | P3 # (wt %) | Stevens 0.5 inch probe ## (gram) |
| --- | --- | --- | --- | --- |
| 1 | 58 | 48 | 1.4 | 316 * |
| 2 | 58 | 45 | 2 | 126 ** |
| 3 | 58 | 42 | 2.6 | 102 ** |
| 4 | 57 | 39 | 3.2 | 71 ** |
| 5 | 46 | 36 | 1.1 | 56 ** |
| 6 | 57 | 33 | 3.8 | 39 ** |
| 7 | 56 | 33 | 4.5 | 58 *** |
| A | 54 | 18.6 | 7.4 | 37 ** |

Wt % based on total fat;
Stevens at 5 degrees Celsius;
* measured after 16 day storage at 5 degrees Celsius;
** measured after 9 day storage at 5 degrees Celsius;
*** measured after 7 day storage at 5 degrees Celsius.

The invention claimed is:

1. A fermented food product comprising:
a water-continuous emulsion, being spoonable and non-liquid at a temperature of 5° C., having a pH-value between 3.5 and 5.8,
the food product comprising at least 60 wt % water, from 10 to 25 wt % fat, and from 0.05 to 15 wt % protein,
wherein the fat comprises a blend of 80-90 wt % of a palm oil midfraction and 10-20 wt % of an interesterified mixture of palm oil, palm kernel oil and palm oil stearin, wherein the fat comprises from 0 to up to 60 wt % of saturated fatty acids (SAFA), at least 40 wt % P2U triglycerides and from 0 to up to 7 wt % P3 triglycerides, and the ratio of SAFA:P2U is up to 1.7, and wherein P is palmitic acid and U is unsaturated fatty acid.

2. The food product of claim 1 wherein the interesterified mixture comprises 86% palm oil, 8% palm kernel oil and 6% palm oil stearin.

3. The food product of claim 1 wherein the ratio of SAFA:P2U is from 1 to 1.3.

4. The food product of claim 1 wherein the fat comprises up to 6 wt % P3 triglycerides.

5. The food product of claim 1 wherein the ratio of SAFA:P2U is up to 1.4.

6. The food product of claim 1 wherein U is the unsaturated fatty acid oleic acid (C18:1).

7. The food product of claim 1 wherein the fat is essentially free of dairy fat.

8. The food product of claim 1 wherein the food product has a Stevens value at 5° C. of up to 126.

9. The food product of claim 1 wherein the amount of protein is from 1 to 10 wt %.

10. The food product of claim 1 wherein at least 90 wt % of the protein is milk protein.

11. The food product of claim 1 having a pH-value between 4.0 and 5.8.

12. A process for preparing a fermented food product, comprising:
adding a palm-based fat comprising at least 40 wt % P2U triglycerides to a mixture comprising water,
acidifying the combined mixture using a bacterial culture comprising acidifying bacteria,
heating the combined mixture to inactivate the bacterial culture, and
obtaining an emulsion comprising the fermented food product;
wherein the fermented food product comprises a water-continuous emulsion, being spoonable and non-liquid at a temperature of 5° C., having a pH-value between 3.5 and 5.8,
the fermented food product comprising at least 60 wt % water, from 10 to 25 wt % fat, and from 0.05 to 15 wt % protein,
wherein the fat comprises a blend of 80-90 wt % of a palm oil midfraction and 10-20 wt % of an interesterified mixture of palm oil, palm kernel oil and palm oil stearin,
wherein the fat comprises from 0 to up to 60 wt % of saturated fatty acids (SAFA), at least 40 wt % P2U triglycerides and from 0 to up to 7 wt % P3 triglycerides, wherein the ratio of SAFA:P2U is up to 1.7,
wherein P is palmitic acid and U is unsaturated fatty acid.

13. The food product of claim 2 comprising from 12 to 18 wt % fat.

14. The food product of claim 3 wherein the fat comprises at least 45 wt % P2U triglycerides.

15. The food product of claim 4 wherein the fat comprises up to 4 wt % P3 triglycerides.

16. The food product of claim 7 wherein the fat comprises up to 5 wt % of dairy fat.

17. The food product of claim 9 wherein the amount of protein is from 2.5 to 4 wt %.

18. The food product of claim 1 wherein the food product has a Stevens value at 5° C. of 102 to 126.

* * * * *